…

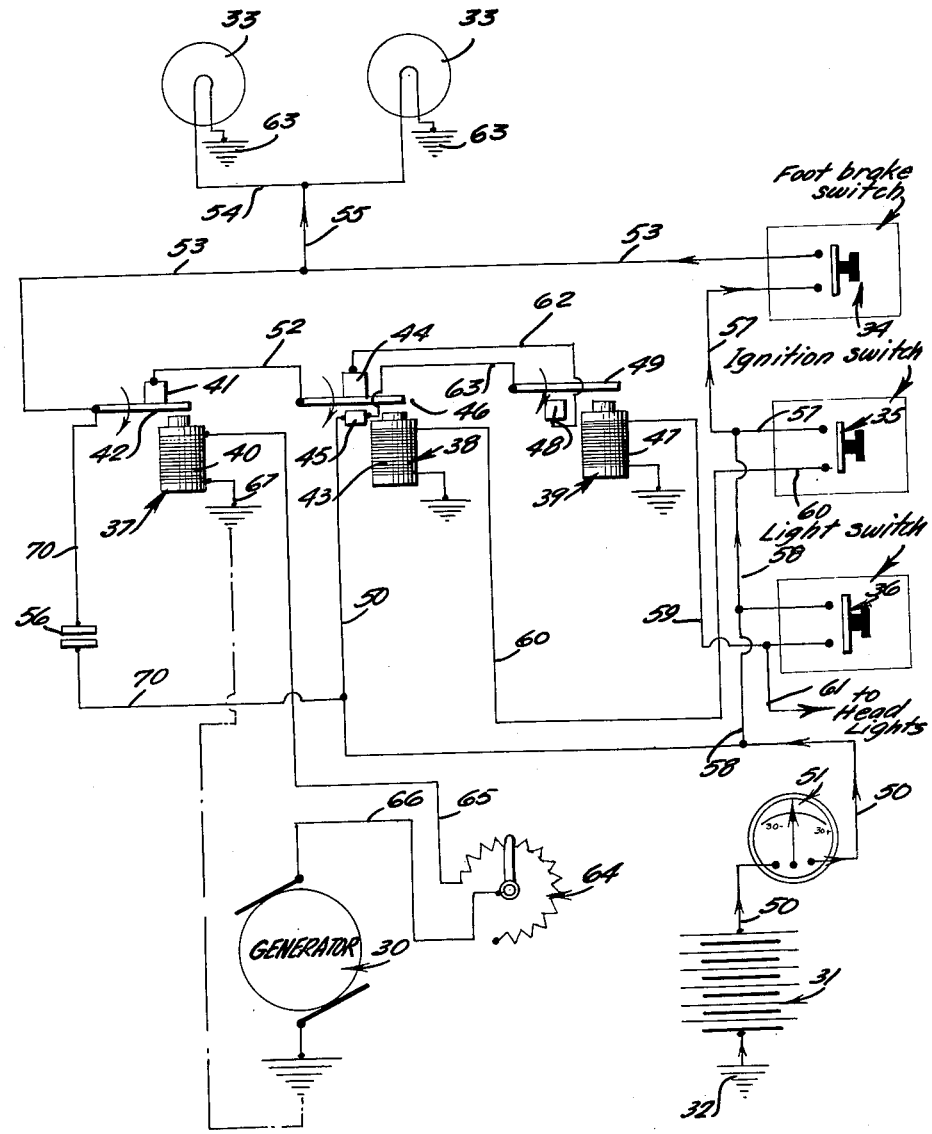

3,004,240
VEHICLE AUTOMATIC STOP LIGHT
Frank R. Berg, 140 Franklin St., Vallejo, Calif.
Filed July 19, 1960, Ser. No. 43,854
3 Claims. (Cl. 340—74)

This invention relates to an electrical system for a vehicle such as an automobile, truck, bus or the like.

The present invention is an improvement over the vehicle automatic stop light shown and described in my prior application Serial Number 739,801 filed June 4, 1958, issued as Patent No. 2,945,209.

It is an object of this invention to provide a vehicle electrical system wherein the vehicle stop lights can be turned on when the headlights are turned on, and when the vehicle is in a stopped position so that it is not necessary to apply pressure on the foot brake, and wherein the stop lights can be turned on either by the ignition or the head light switch and wherein the stop lights will work automatically in either case.

It is another object of the present invention to provide an improved vehicle automatic stop light circuit wherein the current load on the ignition switch will be reduced or minimized, and wherein the vehicle stop lights can be turned on when the vehicle head lights are turned on in addition to the ignition switch and wherein the present invention also provides a fully automatic operation of the stop lights in eithre of the above named conditions, or situations.

It is another object of the present invention to obtain all of the advantages in vehicle automatic stop light circuits set out above, and to impart to the vehicle electrical circuit the desired advantages, while reducing the manufacturing cost.

Other objects will impart the obvious and in part will be pointed out hereinafter.

The attainment of the aforesaid objects and ends, invention further resides in those novel details of construction, combination, and arrangement of parts, all of which will hereinafter be first described in detail and will then be specifically pointed out in the appended claims, reference being had to the accompanying drawings, in which the single figure is a schematic representation of the improved vehicle automatic stop light circuitry of the present invention.

In the drawings, there is shown a preferred embodiment of the invention, and wherein the numeral 30 indicates a generator such as the conventional generator of a vehicle such as an automobile, truck, bus or the like, and the numeral 31 indicates the usual source of electrical energy such as the vehicle battery and the battery 31 may be grounded as at 32. The numeral 33 indicates a pair of stop lights for the vehicle, and the numerals 34, 35 and 36 designate the foot brake switch, ignition switch and light switch respectively.

According to the present invention there is provided an electrical circuit which includes first, second and third control switches which are indicated generally by the numerals 37, 38 and 39 respectively.

The first control switch 37 includes a relay 40, a stationary contact 41, and a movable contact 42.

The second control switch 38 includes a relay 43, stationary contacts 44 and 45, and a movable contact 46.

As shown in the drawings, the third control switch 39 includes a relay 47, a stationary contact 48 and a movable contact 49.

The numeral 50 indicates a first conductor which electrically connects the battery 31 to the stationary contact 45 of the second control switch 38, and the conductor 50 has an ammeter 51 connected therein as shown in the drawings. The numeral 52 indicates a second conductor which serves to electrically connect the movable contact 46 of the second control switch 38 to the stationary contact 41 of the first control switch. A third conductor 53 serves to electrically connect the movable contact 42 of the first control switch 37 to the foot brake switch 34. As shown in the drawings a fourth conductor 54 electrically connects the pair of stop lights 33 together, and there is provided a fifth conductor 55 which electrically connects the conductors 54 and 53 together.

The numeral 57 indicates a sixth conductor which serves to electrically connect the foot brake switch 34 to the ignition switch 35. There is also provided a seventh conductor 58 which is electrically connected to the light switch 36, and the seventh conductor 58 serves to connect the sixth conductor 57 to the first conductor 50. The numeral 59 indicates an eighth conductor which serves to electrically connect the light switch 36 to the relay 47 of the third control switch 39. A ninth conductor 60 electrically connects the relay 43 of the second control switch 38 to the ignition switch 35, and the numeral 61 indicates a tenth conductor for electrically connecting the light swtich 36 to the vehicle headlights. The numeral 62 indicates an eleventh conductor for electrically connecting the stationary contact 48 of the control switch 39 to the stationary contact 44 of the control switch 38. A twelfth conductor 63 electrically connects the stationary contact 45 of the switch 38 and the movable contact 49 of the switch 39.

The numeral 64 indicates an adjustable rheostat, and the rheostat 64 is electrically connected as at 65 and 66 to the relay 40 and to the vehicle generator 30. A conductor 70 has a condenser 56 therein for a purpose to be later described, and the conductor 70 electrically connects the conductor 50 to the movable contact 42.

Thus, it will be seen that there has been provided a vehicle stop light circuit which is an improvement over prior stop lights such as that shown and described in my prior application Serial Number 739,801. The improvement of the present invention is such that the stop lights 33 can be turned on when the head lights are turned on, and the vehicle is in a stopped position and wherein it will not be necessary to apply pressure on the foot brake. The stop lights 33 can be turned on either by the ignition switch 35, or by the head light switch 36, and the stop lights will work automatically in either case. In the present invention additional relays are added as compared to my prior application, and also there will be reduced current load on the ignition switch 35. Furthermore, the rheostat 64 has been added in the generator circuit and this rheostat 64 provides a quick and easy means for maintaining the correct voltage to the coil of the relay 40. The idling voltage delivered by the generator may be higher than the voltage designed to correctly operate the relay 40, and the rheostat 64 can be operated to lower the voltage to the correct idling voltage for the relay 40. The excess idling voltage delivered by the generator 30 may occur after an engine overhaul. Thus, the rheostat provides a convenient means for maintaining the correct idling voltage that the relay 40 is designed for.

The relay 40 is a normally closed single pole single throw voltage relay for the first automatic stop light switch 37. The contacts 44 and 46 are normally closed as shown in the drawings, and the coil 43 is energized from the ignition switch 35 through the conductor 60. In connection with the switch 39, the contacts 48 and 49 are normally open, and the coil 47 is energized from the light switch 36 through the conductor 59 when the head lights are turned on. The switch 37 is a single pole single throw switch, the switch 38 is a single pole double throw switch, and the switch 39 is a single pole single throw switch. In the drawings, the parts are shown in the position when all of the relays are not energized, and when all of the manually operated switches are open, and the stop lights 33 are off.

It will be seen that according to the present invention the improvement permits the stop lights of the vehicle to be turned on when the head lights of the vehicle are turned on in addition to the ignition switch. The present invention also provides a fully automatic operation of the stop lights in either eventuality. It will be noted that the present invention incorporates several additional voltage relays, as well as the condenser 56. The relay 40 is the automatic stop light switch relay and this can either be a D.C. or A.C. voltage single pole single throw type relay. The element 67 may be a grounded return to the generator 30 as shown in the drawings, or it can be a return wire depending upon the type of generator being used such as A.C. or D.C. The coil of relay 40 also operates as usual on the idling voltage of the generator.

The coil of relay 43 is energized when the ignition switch 35 is turned on and has as its source of supply of electrical energy the vehicle battery 31, and this relay 43 is a single pole double throw relay and is also a voltage lever and the movable contact 46 is mounted for movement into and out of electrical engagement with the stationary contacts 44 and 45. The contacts 46 and 44 are normally closed when the coil 43 is not energized and the reason for using the relay 43 is to reduce the current load on the ignition switch 35. The current that lights up the stop lights does not go through the ignition switch as in prior application Serial No. 739,801, and instead the coil of relay 43 which is energized from the ignition switch, uses very little current. The relay 43 acts as a switch as contacts 45, 46 and 44 serve to relay the current to the contacts 41 and 42 of the switch 37.

The relay 47 is a single pole single throw voltage relay and its stationary contact 48 is adapted to be selectively engaged by the movable contact 49. The coil of relay 39 as indicated by the numeral 47 is operated from the vehicle head lights switch 36, and is energized when the head lights are turned on and its source of supply is from the vehicle battery 31. This relay 47 is a normally open relay, and the contacts 49 and 48 are open when the coil 47 is not energized. The contacts 49 and 48 serve to relay current to the contacts 44 and 46 of the switch 38.

The condenser 56 is added in order to reduce the arcing or pitting of the relay contacts of the relays 40, 43 and 47.

The operation of the vehicle stop lights circuit of the present invention is as follows.

First, with the ignition and head light switch off, current goes from, to and through the various elements. The battery 31, the conductor 50 and ammeter 51, the conductor 58, the conductor 57, the foot brake switch 34 if the foot brake is applied, the conductor 53, the conductor 55, the conductor 54, the stop lights 33, the grounded connection 68, the grounded terminal 32 on the battery 31, and the stop lights 33 are on if the foot brake switch 34 is applied.

The next condition which will be discussed is the ignition switch 35 on and with the engine and generator not running and in this instance current goes from, to and through the following elements. The battery 31, the conductor 50, ammeter 51, conductor 58, conductor 57, the ignition switch 35, conductor 60 through the coil 43 to the grounded terminal 32 of the battery 31. The coil 43 is now being energized, and contacts 46 and 45 are closed, and contact 44 is opened. Current to the stop lights 33 now goes from the battery 31, ammeter 51, conductor 50, contact 45, contact 46, to the now closed contacts 41 and 42 of the switch 37, then through the conductor 53, through the conductor 55, through the conductor 54, through the stop lights 33 and through the ground connection 68 through the grounded terminal 32 of the battery 31 and the stop lights are on.

The next condition to be considered is when the ignition switch is one and the engine and generator are running at idle speed, and the continuity or description of the parts is the same as just described in connection with the ignition switch being on and the engine and generator not running, and in this instance the stop lights are on.

The next condition to be described is when the ignition switch 35 is on and the engine and generator are running above idling speed. The increased voltage to the relay coil 40 overcomes the spring tension of the relay 40 and the normally closed contacts 41 and 42 are opened and the stop lights are off.

The next condition to be described is when the head light switch 36 is turned on and the engine and generator are not running and the current goes from, to and through the following elements. The battery 31, conductor 50, ammeter 51, conductor 58, the light switch 36, and the conductor 61 to the head lights so as to turn on the head lights, and the current also goes to the conductor 59 to the coil 47 and then to the ground connection 68 to the grounded terminal 32 of the battery 31. Current to the stop lights 33 now goes from the battery 31 through the conductor 50 to the normally open contact 45 of the relay 43 through the conductor 63 to the now closed contacts 49 and 48, to the normally closed contacts 44 and 46, through the conductor 52 to the normally closed contacts 41 and 42, to the conductor 53, then through the conductor 55 and through the conductor 54 and through the stop lights 33 back through the ground connection through the battery 31 and the stop lights are now on.

With the head light switch 36 on and the engine and generator running at idling speed, the continuity of the elements is the same as in the last paragraph above except that the contacts 45 and 46 are closed as are the contacts 49 and 48, and the contact 44 is now open so as to permit the stop light current to pass through the contacts 45 and 46 and the stop lights are now on.

With the head light switch on and the ignition switch and the engine and generator running above idling speed, the stop lights are now off due to the increased voltage applied to the coil of relay 40, and the contacts 41 and 42 are now open.

The condenser 56 is hooked up across all relay contacts of the relays 40, 43 and 47 and the function of this condenser is to reduce arcing or pitting of the relay contacts. The capacity of the condenser 56 will vary with the current load applied to the relay contacts. The relays 40, 43 and 47 are adapted to be constructed or provided so that they will operate on the applied voltage and current used on the vehicle in which the present invention is mounted.

The conductor 66 from the generator is attached to the movable arm of the rheostat 64 as shown in the drawings.

Minor changes in shape, size and rearrangement of details coming within the field of invention claimed may be resorted to in actual practice, if desired.

What is claimed is:

1. In a vehicle, a generator, a battery, a pair of spaced apart stop lights, a foot brake switch, an ignition switch, and a light switch; an electrical circuit comprising first, second and third control switches; said first control switch comprising a relay electrically connected to said generator, a stationary contact and a movable contact; said second control switch comprising a relay, first and second stationary contacts, and a movable contact; said third control switch comprising a relay, a stationary contact and a movable contact; a first conductor electrically connecting said battery to a stationary contact of said second control switch, a second conductor electrically connecting the movable arm of said second control switch to the stationary contact of said first control switch, a third conductor electrically connecting the movable contact of said first control switch to said foot brake switch, a fourth conductor connecting said pair of stop lights together, a fifth conductor connecting said fourth conductor to said third conductor, a sixth conductor connecting said foot brake switch to said ignition switch, a seventh conductor electrically connected to said light switch and said seventh conductor serving to connect said sixth conductor to said first conductor, an eighth conductor electrically connecting said light switch to the relay of said third control switch, a ninth conductor connecting said ignition switch to the relay of the second control switch, a tenth conductor for connecting said light switch to head lights of a vehicle, an eleventh conductor connecting the stationary contact of said third control switch to a first stationary contact of said second control switch, and a twelfth conductor electrically connecting the second stationary contact of the second control switch to the movable contact of the third control switch.

2. The structure as defined in claim 1 and further including a condenser electrically connected across the contacts of the relays.

3. The structure as defined in claim 1 and further including an adjustable rheostat electrically connected to said generator and also electrically connected to the relay of said first control switch.

References Cited in the file of this patent
UNITED STATES PATENTS

| | | |
|---|---|---|
| 2,216,380 | Von Voightlander | Oct. 1, 1940 |
| 2,788,514 | Schmitt | Apr. 9, 1957 |